United States Patent
Desjardins-Lavisse et al.

(10) Patent No.: US 11,877,579 B2
(45) Date of Patent: Jan. 23, 2024

(54) FOOD DOUGH AND METHOD FOR PRODUCING SUCH A DOUGH

(71) Applicant: GENIALIS, Henrichemont (FR)

(72) Inventors: Isabelle Desjardins-Lavisse, Henrichemont (FR); Guillaume Gillet, Bourges (FR); Laurianne Gressin, Vasselay (FR)

(73) Assignee: GENIALIS, Henrichemont (FR)

( * ) Notice: Subject to any disclaimer, the term of this patent is extended or adjusted under 35 U.S.C. 154(b) by 38 days.

(21) Appl. No.: 15/769,463

(22) PCT Filed: Oct. 18, 2016

(86) PCT No.: PCT/FR2016/052681
§ 371 (c)(1),
(2) Date: Apr. 19, 2018

(87) PCT Pub. No.: WO2017/068271
PCT Pub. Date: Apr. 27, 2017

(65) Prior Publication Data
US 2018/0303105 A1    Oct. 25, 2018

(30) Foreign Application Priority Data

Oct. 22, 2015 (FR) .................... 15 60094

(51) Int. Cl.
| *A21D 13/50* | (2017.01) |
| *A21D 2/18* | (2006.01) |
| *A21D 2/26* | (2006.01) |
| *A23P 30/40* | (2016.01) |

(52) U.S. Cl.
CPC .............. *A21D 13/50* (2017.01); *A21D 2/186* (2013.01); *A21D 2/26* (2013.01); *A23P 30/40* (2016.08)

(58) Field of Classification Search
CPC .......... A21D 2/186; A21D 2/26; A21D 13/50; A23P 30/40
See application file for complete search history.

(56) References Cited

U.S. PATENT DOCUMENTS

| 5,116,631 | A | | 5/1992 | Sakamoto et al. |
| 5,178,895 | A | * | 1/1993 | Duckworth ............. A23L 23/00 426/589 |
| 5,470,391 | A | * | 11/1995 | Mallee ................. A23C 9/1504 127/38 |
| 2003/0077368 | A1 | * | 4/2003 | Serpelloni ................. A23L 2/52 426/548 |
| 2006/0093720 | A1 | * | 5/2006 | Tatz ........................ A23L 29/20 426/548 |
| 2012/0064199 | A1 | | 3/2012 | Kaliappan et al. |

FOREIGN PATENT DOCUMENTS

| DE | 261908 | A3 | 11/1988 |
| FR | 2944949 | A1 | 11/2010 |
| GB | 282923 | A | 1/1928 |
| JP | S59-17950 | A | 1/1984 |
| SU | 437510 | A1 | 7/1974 |
| WO | WO-2010125156 | A1 * | 11/2010 ............. A21D 2/264 |

OTHER PUBLICATIONS

Cook123 "How to Make a Basic Meringue" Youtube Nov. 2013 pp. 1-2 https://www.youtube.com/watch?v=kfiC4wg4rPo (Year: 2013).*
https://www.ncbi.nlm.nih.gov/pmc/articles/PMC6257794/pdf/molecules-15-05162.pdf Junliang Sun et al Characterization of Destrins with Different Dextrose Equivalents Published: Jul. 29, 2010 (Year: 2010).*
Written Opinion of the International Searching Authority issued in International Patent Application No. PCT/FR2016/052681 dated Jan. 3, 2017, with English translation provided.

* cited by examiner

*Primary Examiner* — Vera Stulii
(74) *Attorney, Agent, or Firm* — NIXON & VANDERHYE

(57) ABSTRACT

Disclosed is a method for producing a food dough, including the following steps: preparing a gel including at least starch and maltodextrins diluted in a fluid medium, preparing a foam consisting of one or more food products, and incorporating the gel into the foam.

3 Claims, 3 Drawing Sheets

FOOD DOUGH AND METHOD FOR PRODUCING SUCH A DOUGH

TECHNICAL FIELD

The invention relates to a food dough, in particular having a reduced sugar content, and a method for producing such a food dough. The invention also relates to a product obtained from the food dough.

PRIOR ART

It is known practice to produce a food dough in the form of foam, obtained after incorporating gas into a food product. Without being exhaustive, mention may be made, as examples, of egg white foam, and the products obtained from such a dough, such as meringues in all their forms, macarons, genoises, soufflés, uncooked foams such as chocolate mousse, and also numerous other baked goods.

In their food-processing applications, these foams are commonly stabilized by the addition of a stabilizer such as monosaccharides, oligosaccharides, polysaccharides or proteins. Generally, sugars are widely used to produce sweet products based on egg white foam. Hydrocolloids, water-soluble texturing agents, may also be used.

Thus, numerous patents are known, relating to particular formulations to achieve stable foams, that is to say which do not undergo significant variations in their volume when they are, for example, triturated, incorporated into other doughs, mixed with other ingredients, cooked or frozen.

However, one drawback to these formulations lies in the fact that they are commonly very tacky and liquid, and therefore difficult to handle when laying them out before cooking. Moreover, the baked goods obtained after cooking do not make it possible to obtain all the organoleptic and gustatory properties expected.

In addition, the formulations already known commonly comprise a high sugar content, which does not make it possible to produce food products having a reduced sugar content, or even having a savory flavor.

Doughs are also known for baked goods having a reduced sugar content. In particular, patent FR 2 944 949 describes a dough for baked goods of the meringue or macaron type, comprising egg white and between 2 and 10 g of foaming proteins selected from the group consisting of β-lactogobulin, α-lactalbumin, lactoferrin and patatin or mixtures thereof, between 25 g and 110 g of maltodextrins, between 0.5 g and 10 g, preferably 2 to 5 g, of starch, between 0.5 g and 70 g of powdered sugar (ground sucrose), crystallized glucose, crystallized fructose and/or the mixture thereof, 0.2 to 3 g of sodium chloride, per 100 g of egg white used.

However, the baked goods produced from such a dough are difficult to preserve. Indeed, the baked goods adopt an unpleasant tacky texture, in particular when they are subjected to successive freezing/defrosting steps.

SUMMARY OF THE INVENTION

The invention thus aims to solve at least one of these drawbacks, and in particular aims to obtain a food dough that makes it possible to obtain baked goods having a good appearance, a good aerated texture and a good gustatory quality, while incorporating a reduced amount of sugar.

Thus, the invention relates to a process for producing a food dough, comprising the following steps:
  preparing a gel comprising at least starch and maltodextrins diluted in a fluid medium,
  preparing a foam consisting of one or more food products, and
  incorporating the gel into the foam.

It has become apparent, surprisingly, that the addition of a mixture of starch and of maltodextrins in gel form makes it possible to stabilize the foam while enabling the addition of other ingredients, without causing said foam to collapse.

Indeed, the act of replacing all or some of the sugar of a food dough with maltodextrins incorporated directly in powder form, optionally with a flour, even a pregelatinized flour, does not make it possible to obtain such a food dough having a satisfactory texture. The dough then proves to be tacky, viscous and flattens completely during laying out before cooking. The products obtained after cooking do not have a light and aerated structure, as well as the generally expected organoleptic properties.

According to one embodiment, the gel comprising at least starch and maltodextrins diluted in a fluid medium is prepared according to the following steps:
  a preparation is produced by diluting at least the starch and the maltodextrins in a fluid medium,
  the preparation is heated, and
  the preparation is left to cool in the form of a gel before incorporating it into the foam.

According to one embodiment, the preparation is heated up to a temperature of 60 degrees Celsius.

The invention also relates to a food dough comprising at least one foam consisting of one or more food products, and at least starch and maltodextrins diluted in a fluid medium and incorporated in the foam in the form of a gel.

According to one embodiment, the foam is produced from egg whites, chickpeas aquafaba, whey, milk, and/or saponin extract.

According to one embodiment, the starch is non-hydrolyzed.

According to one embodiment, the gel comprises flour and maltodextrins diluted in water.

According to one embodiment, the maltodextrins of the gel have a mean dextrose equivalent of less than 30, preferentially of between 15 and 20.

According to one embodiment, the food dough also comprises at least one powder and/or purée of vegetables or of fruit, or a flavored syrup.

According to one embodiment, the gel comprises between 10% and 20% by weight of flour, between 10% and 20% by weight of maltodextrins, and between 60% and 80% by weight of water.

According to one embodiment, the gel comprises less than 80% by weight of water.

The invention also relates to a product, in particular a meringue or a macaron, obtained after a step of cooking or drying the food dough according to the invention, and/or produced by the process according to the invention.

Of course, the different features, variants and/or embodiments of the present invention may be combined with one another in various combinations, as long as they are not incompatible or exclusive of one another.

BRIEF DESCRIPTION OF DRAWINGS

The present invention will be better understood, and further features and advantages will become apparent on reading the following detailed description that comprises embodiments given by way of illustration with reference to the appended figures, presented as non-limiting examples, which may serve to add to the understanding of the present invention and the description of the implementation thereof and, where appropriate, contribute to the definition thereof, in which figures.

DESCRIPTION

A detailed description of the invention, accompanied by examples and references to the drawings, follows.

Food Dough

Figure 1:
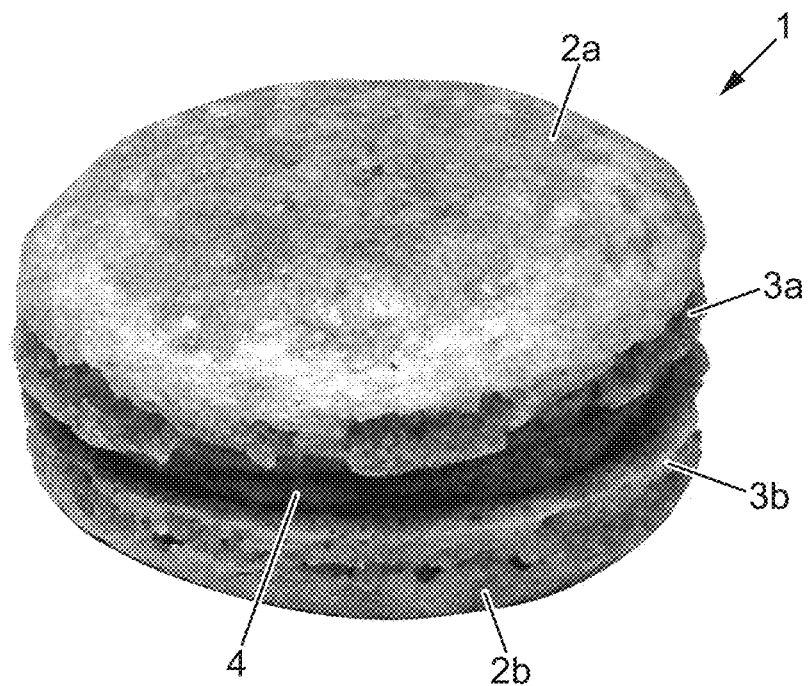
FIG. 1 represents a macaron obtained from a food dough according to the invention.

FIG. 1 represents a food product 1, in particular a macaron, obtained from a food dough according to the invention. As illustrated in FIG. 1, macarons are small, moist, grainy cakes with a round shape, approximately 3 to 5 cm in diameter. They are derived from meringues and are traditionally produced from nut powder, especially that of almonds or hazelnuts, powdered sugar, sugar and egg whites. The macaron 1 consists of two shells 2a, 2b, having characteristic feet 3a, 3b formed at the edge during cooking. The shells 2a, 2b are joined to one another and between them there is a ganache or jam 4.

The food dough comprises a foam. The foam may be produced from one or more food products.

The foam may especially be produced from egg whites. Egg white is a natural product, and its composition may vary depending on the origins. It consists of approximately 90% water. Among the other constituents there are proteins, the main protein being ovalbumin (more than 50% of all the proteins).

The foam may be produced from other ingredients, taken alone or mixed together, such as chickpeas aquafaba, whey, milk, saponin extract, without this list being limiting.

The foam represents between 15% and 30%, preferentially between 18% and 26%, of the total weight of the food dough. Total weight is intended to mean the weight of the food dough once all the ingredients thereof have been added.

The food dough also comprises starch and maltodextrin(s). According to the invention, the starch and at least a portion, or even all, of the maltodextrins are incorporated into the foam in gel form.

The starch is advantageously non-hydrolyzed. Non-hydrolyzed starch is intended to mean a starch having a dextrose equivalent DE close to 0, or substantially equal to 0.

The maltodextrins preferably have a mean dextrose equivalent DE of less than 30, preferentially of between 15 and 20. Thus, a distinction is made between maltodextrins and the sugar traditionally used in baked goods and predominantly formed of sucrose.

Gel is intended to mean a preparation having a network structure and having a viscous appearance intermediate between a totally liquid phase and a totally solid phase, different than a syrup. The gel preferably has a viscosity of between 10 cP and 250 cP (centipoise). The gel represents between 15% and 50%, preferentially between 18% and 40%, of the total weight of the food dough.

According to one embodiment, the food dough may also comprise maltodextrins in powder or syrup form. The maltodextrins added in powder or syrup form represent less than 20%, preferentially between 7% and 12%, of the total weight of the food dough.

Due to the addition of maltodextrins in gel form, or optionally in powder or syrup form, the food dough may comprise a low concentration of sugar, in particular of sucrose, of glucose, fructose and/or of the mixture thereof.

Preferably, the food dough does not comprise foaming proteins. Foaming protein is intended to mean especially β-lactogobulin, α-lactalbumin, lactoferrin, patatin or mixtures thereof.

Generally, aside from the gel, the food dough does not comprise any agent specifically added to enable stabilization of the foam.

According to one embodiment, the food dough also comprises a syrup. The syrup may be a flavored sugar syrup, such as is widely available to consumers, with highly varied flavors. The syrup may also be a syrup comprising maltodextrins, which are neutral in flavor and do not have any sweetening power. The syrup represents 25% to 50%, preferentially 30% to 40%, of the total weight of the food dough.

The food dough may also comprise one or more other additional ingredients. Thus, according to one embodiment, the food dough comprises a puree or a juice of vegetables or of fruit.

According to one embodiment, the food dough comprises one or more powdered ingredients, such as a powder of vegetables or fruit, or spices. In particular, the food dough may comprise almond powder in order to produce macarons. The powdered ingredients are advantageously rehydrated in order to form a paste before being incorporated.

These additional ingredients such as powders, purees, juices, spices, represent less than 25%, preferentially less than 5%, of the total weight of the food dough.

In order to produce macarons as illustrated in FIG. 1, only the almond powder for producing macarons represents more than 5% of the total weight of the food dough.

Process for Preparing the Gel

According to the invention, in a first step (A) a preparation is produced in gel form, comprising at least starch, especially non-hydrolyzed starch, and maltodextrins.

The preparation is produced, by dissolving (or diluting) starch and maltodextrins in a fluid medium.

The fluid medium is for example unwhisked egg white, egg yolk, or water. The fluid medium is preferably water.

The starch is for example flour. Indeed, flour constitutes a source of starch, especially non-hydrolyzed starch, that is simple to use and is widely used by food-processing professionals. The flour may be any cereal flour, such as a wheat or corn flour, chestnut flour, soybean flour, or others. The flour is preferably gluten-free.

According to one embodiment, between 10% and 20% by weight of flour, preferentially approximately 15%, and between 10% and 20% by weight, preferentially 15%, of maltodextrins relative to the total weight of the preparation, are diluted.

By way of example, between 10 g (grams) and 30 g of flour, preferentially 20 g, and between 10 g and 30 g, preferentially 20 g, of maltodextrins, are diluted in 70 g to 140 g of water, preferentially 70 g to 100 g of water.

The total percentage by weight of water is preferably less than 80% of the total weight of the preparation. In particular, the total percentage by weight of water is preferably between 60% and 80%, preferentially 65%, of the total weight of the preparation. The addition of more water subsequently leads to a gel which is too liquid and which does not make it possible to stabilize the foam once incorporated into the latter.

The preparation is heated. The preparation is advantageously heated above 55 degrees Celsius. The preparation may be heated up to a temperature of 70 degrees Celsius. Preferentially, the preparation is heated up to 60 degrees Celsius. The heating is preferably slow, for example using a saucepan over a low heat, in order to control the temperature and to not excessively heat the preparation. The heating of the preparation is advantageously stopped as soon as the preparation reaches the temperature of 60 degrees Celsius.

When the preparation is not heated, or is insufficiently heated, a food dough is subsequently obtained which is very liquid, difficult to layout, and which thus significantly spreads. Thus, products are obtained after cooking which resemble thin disk-shaped cookies, that is to say flat and crispy products. Conversely, when the preparation is heated beyond 70 degrees Celsius, an entirely set gel is obtained that is solid and difficult to incorporate into the foam during the production of the food dough. The latter then contains lumps and does not hold its shape, that is to say it collapses when other ingredients are added.

The preparation is subsequently left to cool without heating, especially at room temperature, optionally after having continued to mix the preparation.

A gel is obtained which may optionally be stored for a few days at low temperature, for example in a refrigerator, before being used in the food dough. Preferably, the gel is then brought back to room temperature before being incorporated into the foam, as will be described below.

Process for Producing the Food Dough

In order to produce a food dough, the foam is produced in a second step (B). Preferably, the foam according to the invention is produced by mechanical expansion. Thus, the production of the foam is for example similar to that conventionally carried out by bakers with a beater fitted with a whisk in order to whisk up egg whites. Preferably, the present invention does not require other specific means such as stirring under partial vacuum, gas bubbling, or an acid-base reaction, in order to produce the foam.

This step (B) has the effect of leading to a significant expansion of the product constituting the foam.

In a third step (C), the gel prepared beforehand according to the preparation process described above is subsequently incorporated into the foam. The foam does not lose volume, such that the density of the food dough is then less than 0.500 g/cm$^3$, or even less than 0.450 g/cm$^3$.

In a fourth step (D), the flavored syrup and/or the puree/juice of vegetables or of fruit is (are) subsequently added.

The maltodextrins in powder or syrup form are also incorporated into the food dough.

The syrup, the puree of vegetables or fruit and the maltodextrins in powder or syrup form are advantageously incorporated into the food dough after the gel is incorporated, so as not to cause the foam to collapse.

In the same way, the additional ingredients are advantageously incorporated into the food dough after the gel.

Thus, according to one embodiment, the order of incorporation of the ingredients into the foam may be as follows:
1) the gel;
2) the syrup(s);
3) the products in powder form, such as powders of fruit and of vegetables, optionally rehydrated beforehand, or the maltodextrins; then
4) the other liquids, such as the juices or purees of fruits or of vegetables, and also for example liquid flavorings and/or colorings.

Once all the ingredients have been incorporated, the food dough can be readily handled. It may be triturated, metered out, formed, molded, etc., without losing its aerated texture. In particular, the dough does not have any handling constraints, as is generally the case with doughs produced according to other known formulations.

The food dough is then subjected to a fifth step (E) of drying or of cooking. This step (E) may be carried out using processes for heating, for evaporating water, for capturing moisture or any other process known to those skilled in the art.

The dough is for example cooked in the oven, especially at a temperature of between 80 degrees Celsius and 150 degrees Celsius for 45 to 180 minutes as a function of the size and shape of the products produced. This step (E) especially makes it possible to evaporate a large portion of the water contained in the food dough.

Figure 2:
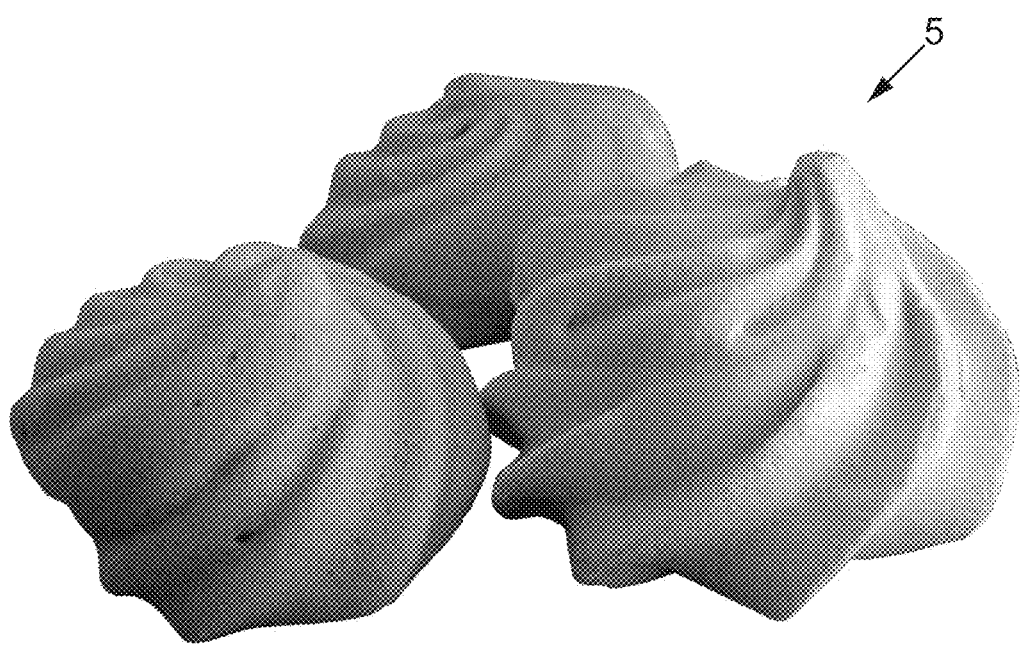
FIG. 2 represents meringues obtained from a food dough according to the invention.

Products are thus obtained from the food dough, such as meringues or macarons, such as those represented in FIGS. 1 and 2.

Figure 2A:
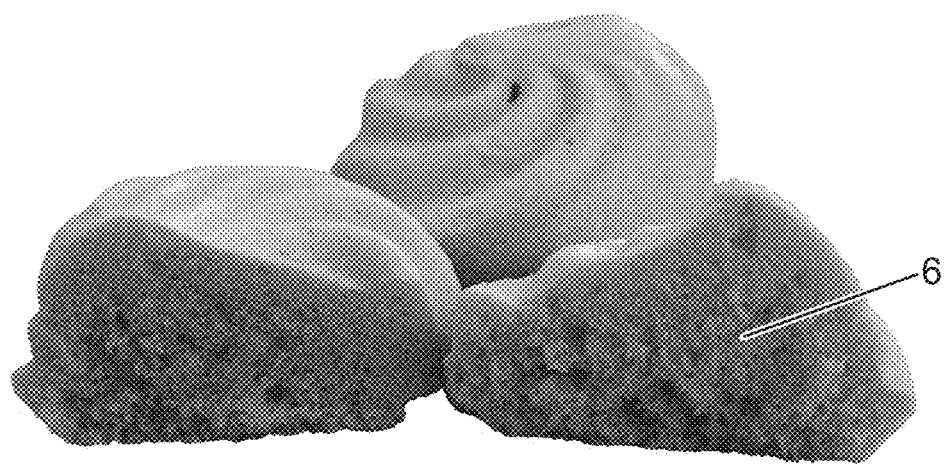
FIG. 2A represents a section through meringues from FIG. 2.
Figure 3:
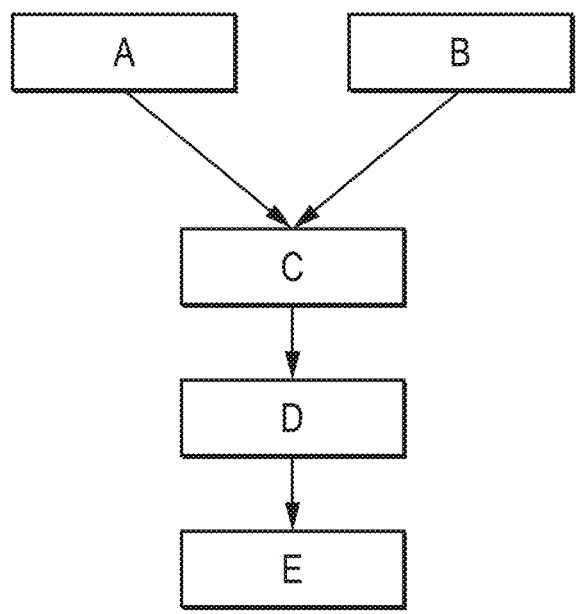
FIG. 3 represents a schematic diagram of the different steps of the process for producing the products from FIGS. 1 and 2.
Figure 4:
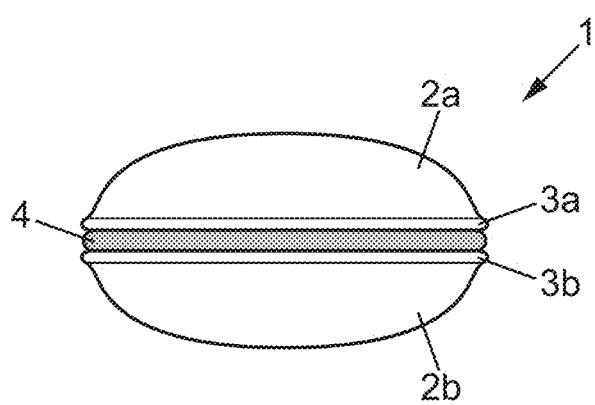
FIG. 4 schematically represents a macaron obtained from a food dough according to the invention.

As represented in FIG. 2A, the products obtained have, for example, a alveolate internal structure 6, similar for example to that of traditional meringues. Advantageously, the products have a low density, advantageously of less than 0.250 g/cm$^3$, or even of less than 0.100 g/cm$^3$, which gives them a very light texture that melts in the mouth.

Advantages

As has already been indicated, the food dough according to the invention makes it possible to produce products in which the sweet flavor may be entirely absent, to enhance a savory flavor or to prepare products with a reduced sugar content, or even a sugar content of zero. Aside from these particular organoleptic qualities, some of the products obtained in this way may be beneficial from a dietary perspective, since they may contain an amount of sugar of between 0% and 25% of the total weight of the food dough, unlike traditional recipes which contain from 30 to 65% of sugar.

The dough thus makes it possible to obtain baked goods of meringue or macaron type either with a reduced sugar content, or "savory" products, that is to say in which only the savory flavor is perceived, since the sweet flavor is entirely absent. According to one embodiment, the food dough therefore makes it possible to produce a savory meringue or a savory macaron.

The food dough also makes it possible to incorporate ingredients that are usually incompatible with whisked-up egg whites (powders and purees of vegetables or fruit, syrups, etc.) using known preparation methods. Indeed, the incorporation of such ingredients usually causes the foam to collapse and leads to the production of finished products which are not aerated but rather are flat and crispy.

Examples of the production of products from a food dough according to the invention are described below. Far from being exhaustive, the examples below make it possible to show the extent of the field of application of the invention. Indeed, the invention makes it possible to treat highly varied types of starting materials and preparations.

EXAMPLE 1

Syrup Meringue

A gel is prepared by dissolving 20 g of corn flour and 20 g of maltodextrins having a dextrose equivalent (DE) equal to 19 in 70 g of water.

The preparation is heated, while being gently stirred in a saucepan, up to 60 degrees Celsius, then is subsequently left for the time taken to prepare an egg white foam.

Said foam is obtained by expanding 80 g of liquid egg whites using a food processor fitted with a whisk. Once the foam is formed, the gel prepared beforehand is incorporated into said foam, using the same food processor, the rotation rate of which has been slightly reduced.

Leaving enough time for the dough to become homogeneous again between each addition, and without modifying the stirring, 150 g of lemon-flavored syrup are then added, then 40 g of maltodextrins in powder form having a dextrose equivalent DE equal to 19 and finally 3 g of lemon juice concentrate.

The food dough obtained is very light and has a density of approximately 0.412 g/cm$^3$. It is thus very similar to a meringue preparation obtained in a traditional way. It may be handled without having to take particular care to be placed in piping bags or a small mechanical dispenser. After laying out small star shapes on baking trays, said star shapes are cooked in a conventional oven at 100 degrees Celsius for 75 minutes.

The products obtained are highly comparable to meringues, except for the fact that they have a pronounced lemon flavor, including the acidity of the fruit, and virtually no sugar flavor. It is thus possible to consume several meringues obtained by the novel process without any phenomena of becoming sick/nauseous due to the excessively high amount of sugar present in traditional products. The products obtained have a density approximately equal to 0.05 g/cm$^3$.

The products may then be packaged at leisure and as a function of the form of consumption, of the supply chain, or of any other constraints to be taken into account for the sale and correct use of the product, for example in plastic bags or plastic boxes. They may also be frozen and defrosted without undergoing any notable alteration in their textures.

An example of meringues 5 obtained according to the invention is represented in FIGS. 2 and 2A.

EXAMPLE 2

Savory Meringue

A gel is prepared by dissolving 10 g of corn flour and 10 g of maltodextrins having a dextrose equivalent DE equal to 19 in 100 g of water.

The preparation is heated, while being gently stirred in a saucepan, up to 60 degrees Celsius, then is subsequently left for the time taken to prepare an egg white foam.

Said foam is obtained by expanding 80 g of chickpeas aquafaba using a food processor fitted with a whisk. Once the foam is well formed, the gel obtained beforehand is incorporated into said foam, using the same food processor, the rotation rate of which has been slightly reduced.

Leaving enough time for the dough to become homogeneous again between each addition, and without modifying the stirring, 150 g of a maltodextrin syrup obtained by dissolving 60 g of maltodextrins with a DE equal to 16 in 90 g of water are added, then 25 g of maltodextrins having a dextrose equivalent (DE) equal to 16, and finally a mixture of 30 g of water, 8 g of tomato powder and 1 g of salt.

The obtained food dough is very light and has a density of approximately 0.440 g/cm$^3$. It is thus very similar to a meringue preparation obtained in a traditional way. It may be handled without having to take particular care to be placed in piping bags or a small mechanical dispenser. After laying out pavlova base shapes on baking trays, said pavlova base shapes are cooked in a conventional oven at 100 degrees Celsius for 180 minutes.

The products obtained are highly comparable to pavlova bases obtained from traditional meringues, except for the fact that they have a pronounced tomato flavor and no sweet flavor. The bases may then be dressed with a vegetable mousse in order to obtain an entirely savory pavlova, which may optionally be stored in the freezer while waiting to be consumed. The meringue base remains solid but meltingly soft after defrosting. The products obtained have a density approximately equal to 0.078 g/cm$^3$.

EXAMPLE 3

Savory/Plain Macaron

A gel is prepared by dissolving 10 g of chestnut flour and 10 g of maltodextrins having a dextrose equivalent DE equal to 19 in 100 g of water.

The preparation is heated, while being gently stirred in a saucepan, up to 60 degrees Celsius, then is subsequently left for the time taken to prepare an egg white foam.

Said foam is obtained by expanding 80 g of egg whites using a food processor fitted with a whisk. Once the foam is well formed, the gel obtained beforehand is incorporated into said foam, using the same food processor, the rotation rate of which has been slightly reduced.

Leaving enough time for the preparation to become homogeneous again between each addition, and without modifying the stirring, 100 g of a maltodextrin syrup obtained by dissolving 50 g of maltodextrins with a DE equal to 6 in 50 g of water are added, then 25 g of maltodextrins having a dextrose equivalent (DE) equal to 19. The food processor is finally fitted with a flat beater and the rate of rotation set to the minimum, before adding 80 g of almond powder.

The dough is homogeneous and ready to be placed into a piping bag after approximately 2 minutes of mixing. The obtained food dough is very light and very similar to a macaron preparation obtained in the traditional way. It is in particular smooth and glossy. It may be handled without having to take particular care to be placed in piping bags or a small mechanical dispenser. After laying out on baking trays, the products are cooked for 15 minutes at 120° C. then 20 minutes at 140° C. in an upright oven suitable for baked goods.

The shells obtained are similar to macaron shells produced in the traditional way. They are smooth and flat and have a very clear foot. Without preference, they may be assembled with fillings of buttercream or jam type before being frozen. In particular, this "plain" shell, not having a sweet flavor but having a pronounced almond flavor, may be assembled without preference with sweet or savory products. After defrosting, the assembled products have the characteristics of a crunchy outside of the shell, and a soft inside, that are particular to macarons. The products obtained have a density approximately equal to 0.21 g/cm$^3$.

An example of macaron 1 obtained according to the invention is represented in FIG. 1.

Of course, the invention is not limited to the embodiments described above and provided solely by way of example. It encompasses various alterations, alternative forms and other variants that those skilled in the art could envisage in the context of the present invention, and especially all combinations of the different modes described above, which can be taken separately or in combination.

In particular, the invention also makes it possible to obtain other products such as genoises, soufflés, uncooked foam such as chocolate mousse, and also numerous other baked goods.

The invention claimed is:

1. A method for producing a food dough for forming a cooked or uncooked food comprising starch, the method comprising the following steps:
   (A) preparing a gel consisting of between 10% and 20% by weight of flour as the starch source and between 10% and 20% by weight of maltodextrins diluted in a fluid medium selected from the group consisting of unwhisked egg white, egg yolk, water, and combinations thereof and heating it to a temperature ranging from 55° C. to 70° C., wherein the maltodextrins have a mean dextrose equivalent (DE) of less than 30,
   (B) preparing a foam consisting of one or more food products which comprise chickpeas aquafaba, whey, milk or saponin extract,
   (C) incorporating the gel into the foam so that the gel represents between 15% and 50% of the total weight of the food dough, and
   (D) incorporating one or more additional ingredients comprising a syrup representing between 25% to 50% of the total weight of the food dough, powdered ingredients, purees, juices, or spices representing less than 25% of the total weight of the food dough.

2. The method of claim 1, wherein the gel consisting of between 10% and 20% by weight of flour as the starch source and between 10% and 20% by weight of maltodextrins diluted in a fluid medium is prepared according to the following steps:
   diluting between 10% and 20% by weight of flour as the starch source and between 10% and 20% by weight of maltodextrins in a fluid medium to produce a preparation, wherein the maltodextrins have a mean dextrose equivalent (DE) of less than 30,
   heating the preparation, and
   letting the preparation to cool in the form of a gel before incorporating the preparation into the foam.

3. The method of claim 2, wherein the preparation is heated to a temperature of 60 degrees Celsius.

* * * * *